Dec. 19, 1933.  W. M. JACOBS  1,940,547
RADIO DIRECTION INDICATING DEVICE
Filed Dec. 29, 1931
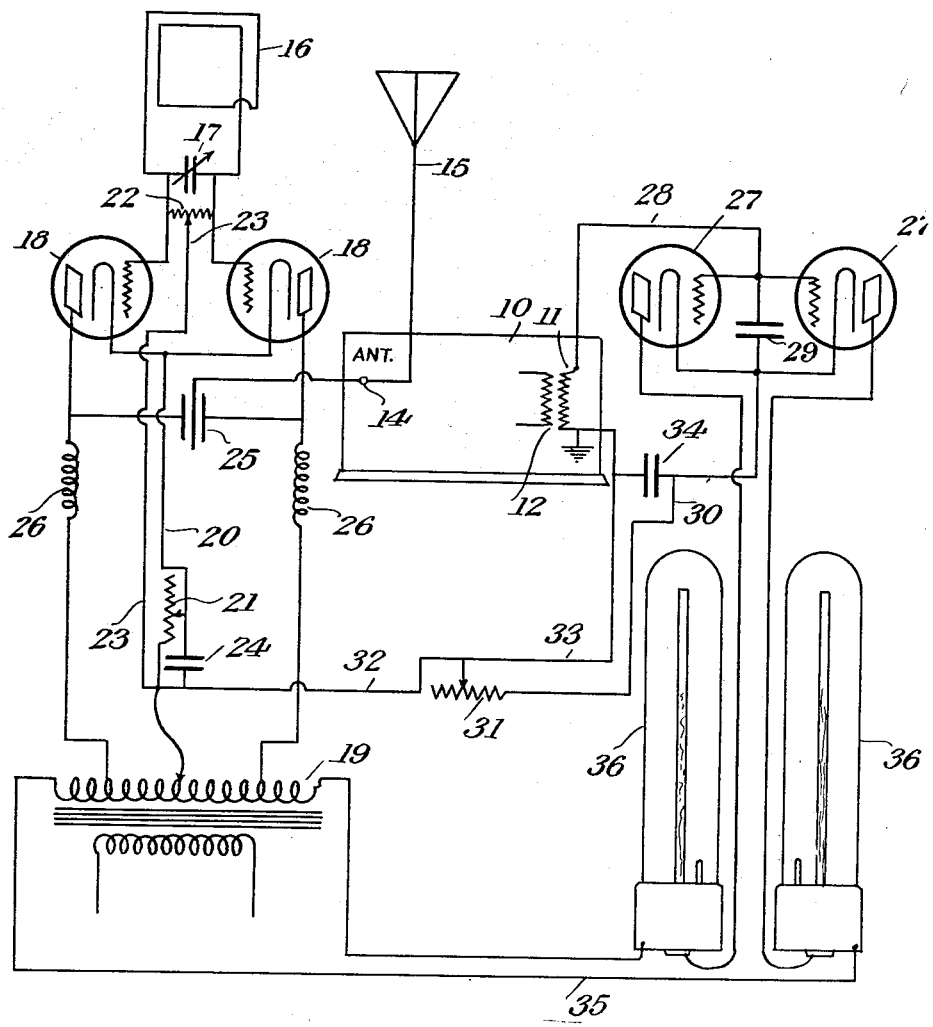
William M. Jacobs
INVENTOR
BY Victor J. Evans & Co.
ATTORNEYS Patented Dec. 19, 1933

1,940,547

UNITED STATES PATENT OFFICE 1,940,547

RADIO DIRECTION INDICATING DEVICE

Wilbur M. Jacobs, Sacramento, Calif.

Application December 29, 1931
Serial No. 583,764

5 Claims. (Cl. 250—11)

The object of the invention is to provide a circuit arrangement for use in connection with the conventional radio receiver whereby the direction of a transmitting station whose signal it is desired to receive may be definitely determined with reference to the receiver and with a fine degree of accuracy; to provide a circuit arrangement of the kind indicated in which the initial adjustments necessary to effect the indicated function may be readily made; and to provide a circuit which may be employed to carry out the functions of a compass by reason of it being possible to definitely determine the direction of a selected transmitting station from any point at which the apparatus may be located.

With this object in view, the invention consists in a construction and combination of parts of which a preferred circuit arrangement is illustrated in the accompanying drawing but to which the invention is not to be restricted further than the terms of the appended claims prescribe.

The drawing is a diagrammatic view of a circuit arrangement laid out in accordance with the invention.

The invention is designed for use in connection with a conventional radio receiver 10 of which the output terminals 11 are connected to the secondary of an output transformer 12. To the antenna post 14 of the receiver, the usual antenna 15 is connected, this being preferably a short antenna. An input circuit is also provided with a loop 16 which may or may not be tuned but which it is preferable to tune, as by means of a variable condenser 17 connected across the terminals of the loop. The energy received in the loop is employed to affect the grids of the tubes 18 which are the conventional triodes whose filaments are excited from any suitable source, such as a low voltage secondary of a transformer. The filament circuits are not shown, as they are unnecessary to an understanding of the invention.

The conventional push-pull form of connection is employed for the tubes 18, the plates being excited from the secondary of a transformer 19 of which the return is over a conductor 20 connecting a midtap of the secondary of the transformer with the cathodes or filaments of the tubes 18. A variable resistor 21 is interposed in the conductor 20 and, connecting between the cathodes and the supply source, may be employed as a biasing resistor for the grids of the tubes 18 to which the terminals of the loop 16 are connected. A potentiometer 22 is connected across the terminals of the loop and the movable arm is connected, by means of a conductor 23, with the return conductor 20 between the resistor 21 and the midtap on the secondary of the transformer 19.

The resistor 20 is bridged with a condenser 24 carrying out the usual by-pass function.

Connected across the plates of the two tubes 18 is a triple plate condenser 25 of which the two outside plates are connected respectively to the two plates of the tubes 18 and the center plate connected with the antenna post 14 of the receiver.

Radio frequency choke coils 26 are connected in the plate leads of the tubes 18 between the secondary of the transformer 19 and the points of connection of the condenser 26 with said plates, so that radio frequency currents will be confined to the plate circuits of the two tubes 18.

To the output circuit of the receiver, there are connected the grids of the power tubes 27, the grids of these two tubes being connected in parallel, with a lead 28 connecting them to one of the output binding posts. A condenser 29 is connected across the grids and cathodes of the tubes 27 to smooth out the audio frequency currents and the cathodes are connected by a lead 30 with one terminal of a variable resistor 31 whose other terminal is connected by means of a lead 32 with the center tap of the secondary of the transformer 19. The remaining output terminal of the receiver is connected by means of a lead 33 with the variable resistor 31 but at that terminal with which the lead 32 is connected, and the resistor is by-passed with a condenser 34 performing the conventional by-pass function.

The plates of the tubes 27 are excited also from the primary of the transformer 19 but at a higher potential than the plates of the tubes 18, the extremities of the secondary being connected with the plates by means of leads 35 in which are included the glow tubes 36, these being serially connected in the plate circuits of the two tubes and being of the conventional form in which a column of light travels up and down a center conductor, varying in intensity and height according to the applied voltage.

Since the resistor 31 is connected between the cathodes of the tubes 27 and the center tap of the primary of the transformer 19, it is included in the plate circuits of the two tubes and its adjustment will, therefore, vary the resistance in the plate circuits to regulate the height of the columns of light in the tubes 36.

In the operation of the invention, the receiver 10 is tuned to a selected signal and the loop 16 correspondingly tuned. If the plane of the loop be at right angles or perpendicular to the line of direction of the transmitting station whose signal is being received, the columns of light in the two tubes 36 will be at the same height. If the plane of the loop be not in such right-angular position, one side of the loop will be nearer and the other side further away from the transmitting station, so that the grid of that tube 18 connected with the near side will be affected with greater intensity than is the grid of the remaining tube and the power tube 27 whose plate is excited from the same side of the transformer as the more highly affected tube 18 will be correspondingly affected and its glow tube 36 will have its column of light increased in height, the column of light in the other glow tube dropping in height by reason of its associated tubes 18 and 27 being reversely affected. This result obtains by reason of the fact that the tubes 18 and 27 to one side of the secondary of the transformer 19 are at positive potential at the same time the corresponding tubes connected to the other side of the secondary are at negative potential.

In initially adjusting the apparatus, the loop is set to a position where the columns of light in both tubes 36 rise to the same height. Then the loop is shifted through a full 180° when, if it has been properly balanced, the columns in the two glow tubes will stand at the same height. If it has not been properly balanced, there will be a difference in height in the two columns of light in the two tubes. Under such conditions the potentiometer 22 is adjusted to equalize the distribution of energy in the loop, when the height of the light columns will be equalized. The loop is then turned to its original position and, if the columns of light remain the same, the adjustment has been correct. If there is any variation, further adjustment of the potentiometer is made in the new position of the loop and this is continued until the light columns remain at the same height in the two 180° difference in positions of the loop.

The above adjustments are made to initially balance the circuit with the particular parts employed and thereafter no further adjustment is necessary unless there be a change in some of the parts.

Adjusted as above described, the loop may be employed to definitely point out the direction of a desired receiving station by observing the relation of the light columns in the two tubes 36 which, when the same height, means that the axis of the loop points in the exact direction of the transmitting station.

In the present device, the loop energy does not have to be balanced against the antenna energy, as the loop only adds energy to or takes it from the antenna.

Adjustment of the variable resistor 21 changes the bias on the grids of the tube 18, so that the amplification of the same may be changed.

Obviously, the invention may be carried out with the use of a double recording meter substituted in place of the glow lamps.

The invention having been described, what is claimed as new and useful is:

1. A direction indicating device comprising a pair of triodes connected in push-pull, a loop terminally connected with the grids of said triodes, a receiver, a capacity coupling the output of said triodes to the input of the receiver, power triodes connected to the output of the receiver with their grids in parallel and their plate circuits in push-pull, an alternating current energizing source exciting the plate circuits of said push-pull and power triodes in phase in pairs consisting of one push-pull and one power triode with one pair at positive potential when the other is negative, and electroresponsive indicating devices included in the plate circuits of the power triodes.

2. A direction indicating device comprising a pair of triodes connected in push-pull, a loop terminally connected with the grids of said triodes, a receiver, a capacity coupling the output of said triodes to the input of the receiver, power triodes connected to the output of the receiver with their grids in parallel and their plate circuits in push-pull, glow tubes connected in the plate circuits of the last said triodes, and an alternating current source energizing the plates of all of said tubes so that the push-pull and power triodes are energized in phase in pairs consisting of one push-pull and one power triode with one at positive potential when the other is negative.

3. A direction indicating device comprising a pair of triodes connected in push-pull, a loop terminally connected with the grids of said triodes, a receiver, a capacity coupling the output of said triodes to the input of the receiver, power triodes connected to the output of the receiver with their grids in parallel and their plate circuits in push-pull, glow tubes connected in the plate circuits of the last said triodes, an alternating current source energizing the plates of all of said tubes so that the push-pull and power triodes are energized in phase in pairs consisting of one push-pull and one power triode with one at positive potential when the other is negative, and a tuning condenser connected across the terminals of the loop.

4. A direction indicating device comprising a pair of triodes connected in push-pull, a loop terminally connected with the grids of said triodes, a receiver, a capacity coupling the output of said triodes to the input of the receiver, power triodes connected to the output of the receiver with their grids in parallel and their plate circuits in push-pull, glow tubes connected in the plate circuits of the last said triodes, an alternating current source energizing the plates of all of said tubes so that the push-pull and power triodes are energized in phase in pairs consisting of one push-pull and one power triode with one at positive potential when the other is negative, said capacity consisting of a triple plate condenser connected across the plates of the first said triodes and having its center plate connected to the input of the receiver.

5. A direction indicating device comprising a pair of triodes connected in push-pull, a loop terminally connected with the grids of said triodes, a receiver, a capacity coupling the output of said triodes to the input of the receiver, power triodes connected to the output of the receiver with their grids in parallel and their plate circuits in push-pull, glow tubes connected in the plate circuits of the last said triodes, an alternating current source energizing the plates of all of said tubes so that the push-pull and power triodes are energized in phase in pairs consisting of one push-pull and one power triode with one at positive potential when the other is negative, and a potentiometer connected across the terminals of the loop with its movable arm connected in the plate circuits of the first said tubes between the cathodes of the latter and the source of supply.

WILBUR M. JACOBS.